US012306997B2

(12) United States Patent
Lu et al.

(10) Patent No.: US 12,306,997 B2
(45) Date of Patent: May 20, 2025

(54) METHOD AND DEVICE FOR IMPLEMENTING IDENTITY ENDORSEMENT ON BLOCKCHAIN

(71) Applicant: Shanghai NanoJClean Technology Co., Ltd., Shanghai (CN)

(72) Inventors: Duanxin Lu, Shanghai (CN); Jianliang Gu, Shanghai (CN)

(73) Assignee: Shanghai NanoJClean Technology Co., Ltd., Shanghai (CN)

( * ) Notice: Subject to any disclaimer, the term of this patent is extended or adjusted under 35 U.S.C. 154(b) by 0 days.

(21) Appl. No.: 17/768,357

(22) PCT Filed: Oct. 13, 2020

(86) PCT No.: PCT/CN2020/120634
§ 371 (c)(1),
(2) Date: Apr. 12, 2022

(87) PCT Pub. No.: WO2021/073502
PCT Pub. Date: Apr. 22, 2021

(65) Prior Publication Data
US 2024/0143843 A1     May 2, 2024

(30) Foreign Application Priority Data
Oct. 14, 2019    (CN) .................... 201910973623.X (51) Int. Cl.
*G06F 21/00*     (2013.01)
*G06F 21/62*     (2013.01)
(Continued)

(52) U.S. Cl.
CPC ........ *G06F 21/645* (2013.01); *G06F 21/6272* (2013.01); *H04L 9/50* (2022.05)

(58) Field of Classification Search
CPC .... G06F 21/645; G06F 21/6272; G06F 21/33; G06F 21/6245; H04L 9/50; H04L 9/3239; H04L 9/3268
See application file for complete search history.

(56) References Cited

U.S. PATENT DOCUMENTS 7,813,822 B1 * 10/2010 Hoffberg ................ H04N 7/163
                                                                              381/73.1
11,282,139 B1 * 3/2022 Winklevoss ........... G06Q 40/04
(Continued)

FOREIGN PATENT DOCUMENTS

CN       106372941 A    2/2017
CN       106453222 A    2/2017
(Continued)

*Primary Examiner* — Mahfuzur Rahman
(74) *Attorney, Agent, or Firm* — Downs Rachlin Martin PLLC (57) ABSTRACT

A computer-implemented method and device for implementing identity endorsement on a blockchain are provided. In some embodiments the method includes that: a user submits, as an applicant, certification information to a third-party certification authority, the third-party certification authority reviews and generates a certification statement, and the third-party certification authority deposits deposit information of the certification statement on the blockchain, and returns the certification statement including the deposition information to the user; an information requester requests for the certification statement from the user, and the user decrypts the certification statement and then sends the certification statement to the information requester; and the information requester checks in the blockchain, verifies validity of the certification statement and qualification of the third-party certification authority, and completes user identity certification after confirmation. According to this example solution, only deposit information of the certification statement is stored on a blockchain, which not only (Continued)

confirms the real identity information of users, but also does not leak the information. Moreover, without changing the architecture of the existing accounts, identity information may be added to an account and can also be verified in the blockchain.

12 Claims, 3 Drawing Sheets

(51) Int. Cl.
    *G06F 21/64*     (2013.01)
    *H04L 9/00*     (2022.01)

(56) References Cited

U.S. PATENT DOCUMENTS

| | | | |
|---|---|---|---|
| 11,349,674 B2 | 5/2022 | Guo et al. | |
| 11,777,728 B2* | 10/2023 | Noonan | H04L 9/3263 713/171 |
| 2016/0283920 A1 | 9/2016 | Fisher et al. | |
| 2017/0005804 A1* | 1/2017 | Zinder | H04L 9/3239 |
| 2018/0216946 A1* | 8/2018 | Gueye | G01C 21/3617 |
| 2018/0227131 A1 | 8/2018 | Ebrahimi et al. | |
| 2018/0322491 A1 | 11/2018 | Madisetti et al. | |
| 2019/0036680 A1 | 1/2019 | Sundaresan | |
| 2020/0013055 A1* | 1/2020 | Sandor | G06Q 20/0658 |
| 2020/0366480 A1* | 11/2020 | Noonan | G06Q 20/38215 |
| 2020/0380520 A1* | 12/2020 | Kavali | G06Q 20/4016 |
| 2021/0136073 A1 | 5/2021 | Wang et al. | |
| 2022/0060335 A1* | 2/2022 | Pinedo Hoyvik | H04L 9/3239 |
| 2024/0143843 A1* | 5/2024 | Lu | H04L 9/3239 |

FOREIGN PATENT DOCUMENTS

| | | |
|---|---|---|
| CN | 107079037 A | 8/2017 |
| CN | 107086909 A | 8/2017 |
| CN | 107196966 A | 9/2017 |
| CN | 107547514 A | 1/2018 |
| CN | 108235806 A | 6/2018 |
| CN | 108418680 A | 8/2018 |
| CN | 108615148 A | 10/2018 |
| CN | 109472166 A | 3/2019 |
| CN | 109598615 A | 4/2019 |
| CN | 109670825 A | 4/2019 |
| CN | 110224837 A | 9/2019 |
| CN | 110851857 A | 2/2020 |

* cited by examiner

METHOD AND DEVICE FOR IMPLEMENTING IDENTITY ENDORSEMENT ON BLOCKCHAIN

TECHNICAL FIELD

The present disclosure relates to the field of data information processing, and more particularly, to a method and a device for implementing identity endorsement on a blockchain.

BACKGROUND

A blockchain is a new application mode of a computer technology such as distributed data storage, point-to-point transmission, a consensus mechanism, and an encryption algorithm. A blockchain technology is widely used in finance, healthcare, copyright, communications, Internet of Things, file management, and other technical fields. The blockchain technology can ensure the integrity, permanence, and unalterability of all data, and may solve the technical problems of deposit, tracking, and backtracking in the above technical fields.

In the existing blockchain technology, an address or account on the blockchain cannot be contacted with a real user entity having the address or account, and there is a certain degree of anonymity. When the blockchain technology may be applied in technical fields such as finance, healthcare, copyright, communications, Internet of Things, and file management, in the architecture of the existing blockchain accounts, an account cannot be actually contacted with a person or entity in a real environment on the blockchain, causing that the user identity cannot be confirmed. Since accounts of users on the blockchain are independent of each other, when a user in the real environment holds a plurality of private keys, a service-offering third party cannot offer perfect services to the user based on the user identity; or for an information request, the resulted information is not complete.

SUMMARY OF THE INVENTION

In order to solve the above technical problems, the present disclosure provides a method and device for implementing identity endorsement on a blockchain. The method and the device are configured to solve the technical problems in the prior art that a service-offering third party cannot offer perfect services to a user based on the user identity or resulted information is not complete for information request due to failure to confirm user identity on a blockchain.

According to a first aspect of the present disclosure, a method for implementing identity endorsement on a blockchain is provided, that may include:

step S101: submitting, by a user as an applicant, certification information to a third-party certification authority, reviewing by the third-party certification authority, generating a certification statement according to the certification information, generating, by the third-party certification authority, corresponding deposit information of the certification statement according to the certification statement, storing the deposit information on a blockchain, attaching the deposit information into the certification statement, and returning a complete certification statement including the deposit information to the user, the user being an individual user or an enterprise; and step S102: requesting, by an information requester, for the certification statement from the user, informing of, by the user, one of own accounts, decrypting the own certification statement and then sending it to the information requester in a secure manner, checking, by the information requester, in the blockchain, verifying the validity of the certification statement and the qualification of the third-party certification authority, and completing user identity certification after confirmation.

Further, step S101 may include:

step S1011: registering, by a user, an account on the blockchain;

step S1012: submitting, by the user as an applicant, certification information to a third-party certification authority;

step S1013: reviewing, by the third-party certification authority, the certification information, generating a certification statement according to the materials submitted by the user, and signing, by the third-party certification authority, the certification statement with a private key;

step S1014: returning, by the third-party certification authority, the signed certification statement to the applicant, signing, by the applicant, the certification statement with a private key corresponding to an account of the applicant after confirming that information in the certification statement is correct, and returning the certification statement signed with the private key corresponding to the account to the third-party certification authority;

step S1015: generating, by the third-party certification authority, corresponding deposit information of the certification statement according to the certification statement signed by the applicant, storing the deposit information on the blockchain, attaching the deposit information into the certification statement, returning a complete certification statement including the deposit information to the applicant, and storing, also by the third-party certification authority, a complete certification statement including the deposit information; and step S1016: storing, by the applicant, a complete certification statement including the deposit information.

Further, the user identity may be supplementarily registered after step S102, and supplementarily registering the user identity includes:

step S1021: issuing, by a user, a supplementary certification application and sending the application to a blockchain smart contract, the supplementary certification application containing signature information of an account of the user that has been certificated, and signature information corresponding to one or more to-be-supplementarily-registered accounts;

step S1022: verifying, by the blockchain smart contract, whether the account that has been certificated is valid, if yes, proceeding to step S1023, otherwise, ending the supplementary registration;

step S1023: certificating, by the blockchain smart contract, whether the user is an actual holder of the to-be-supplementarily-registered account, if yes, proceeding to step S1024, and if no, ending the supplementary registration; and step S1024: binding, by the blockchain smart contract, a plurality of supplementarily registered accounts submitted by the user to the deposit information of the certification statement that has been certificated.

Further, verifying, by the blockchain smart contract, whether the account that has been certificated is valid may include:

S1: checking whether account information submitted by the user exists in the blockchain, if yes, proceeding to S2, otherwise, the verification failing;

S2: determining whether the account information has been certificated, that is, whether the account has been bound to the deposit information of the certification statement, if the account submitted by the user is a main account, determining whether the main account has been bound to the deposit information of the certification statement, if the user submits a sub-account, checking whether the sub-account has a main account associated therewith and determining whether the main account has been bound to the deposit information of the certification statement, if the account information has been certificated, proceeding to S3, and if the account information has not been certificated, the verification failing; and S3: determining whether the bound deposit information of the certification statement has been canceled, if yes, the verification failing, and if no, passing the verification.

Further, the user identity may be canceled after step S102, and the cancellation of the user identity may include two cancellation modes: a user-based active cancellation mode and a third-party certification authority-based cancellation mode.

The user-based active cancellation mode may include:

S1: sending, by the user, cancellation information to the blockchain directly by himself/herself or through an agency;

S2: after the blockchain verifies the user identity through the account, canceling the deposit information of the certification statement of the user; and S3: monitoring, by the third-party certification authority, the generated certification statement, and if the deposit information of the certification statement that is actively canceled by the user is found, executing, by the third-party certification authority, an internal cancellation process to cancel the certification statement of the user stored in the third-party certification authority;

The third-party certification authority-based cancellation mode may include:

1): sending, by the third-party certification authority, cancellation information to the blockchain;

2): after the blockchain verifies the authority identity through the account of the third-party certification authority, canceling specified deposit information of the certification statement; and 3): after confirming that the cancellation is successful, informing, by the third-party authority, the user of that the user identity has been canceled.

According to a second aspect of the present disclosure, a device for implementing identity endorsement on a blockchain is provided, that may include:

an identity registration module, configured to submit, by a user as an applicant, certification information to a third-party certification authority, review by the third-party certification authority, generate a certification statement according to the certification information, generate, by the third-party certification authority, corresponding deposit information of the certification statement according to the certification statement, store the deposit information on a blockchain, attach the deposit information into the certification statement, and return a complete certification statement comprising the deposit information to the user, the user being an individual user or an enterprise; and an identity certification module, configured to request, by an information requester, for the certification statement from the user, inform of, by the user, one of own accounts, decrypt the own certification statement and then send it to the information requester in a secure manner, check, by the information requester, in the blockchain, to verify the validity of the certification statement and the qualification of the third-party certification authority, and complete user identity certification after confirmation.

Further, the identity registration module may include:

a registration sub-module, configured to register, by a user, an account on the blockchain;

a certification information submitting sub-module, configured to submit, by the user as an applicant, certification information to a third-party certification authority;

a reviewing sub-module, configured to review, by the third-party certification authority, the certification information, generate a certification statement according to the materials submitted by the user, and sign, by the third-party certification authority, the certification statement with a private key;

a confirmation sub-module, configured to return, by the third-party certification authority, the signed certification statement to the applicant, sign, by the applicant, the certification statement with a private key corresponding to an account of the applicant after confirming that information in the certification statement is correct, and return the certification statement signed with the private key corresponding to the account to the third-party certification authority;

a first storage sub-module, configured to generate, by the third-party certification authority, corresponding deposit information of the certification statement according to the certification statement signed by the applicant, store the deposit information on the blockchain, attach the deposit information into the certification statement, return a complete certification statement comprising the deposit information to the applicant, and store, also by the third-party certification authority, a complete certification statement comprising the deposit information; and a second storage sub-module, configured to store, by the applicant, a complete certification statement including the deposit information.

Further, the device for implementing identity endorsement on a blockchain may further include: a supplementary registration module, configured to supplementarily register the user identity. The supplementary registration module includes:

a supplementary certification application sub-module, configured to issue, by a user, a supplementary certification application and send the application to a blockchain smart contract, the supplementary certification application containing signature information of an account of the user that has been certificated, and signature information corresponding to one or more to-be-supplementarily-registered accounts;

a first determination sub-module, configured to verify, by the blockchain smart contract, whether the account that has been certificated is valid;

a second determination sub-module, configured to certificate, by the blockchain smart contract, whether the user is an actual holder of the to-be-supplementarily-registered account; and an information binding sub-module, configured to bind, by the blockchain smart contract, a plurality of supplementarily registered accounts submitted by the user to the deposit information of the certification statement that has been certificated.

Further, the first determination sub-module may include:

a check sub-module, configured to check whether account information submitted by the user exists in the blockchain;

a determination sub-module, configured to determine whether the account information has been certificated, that is, whether the account has been bound to the deposit information of the certification statement, if the account submitted by the user is a main account, determine whether the main account has been bound to the deposit information of the certification statement, if the user submits a sub-account, check whether the sub-account has a main account associated therewith, and determine whether the main account has been bound to the deposit information of the certification statement; and a cancellation determination sub-module, configured to determine whether the bound deposit information of the certification statement has been canceled.

Further, the device for implementing identity endorsement on a blockchain may further include: an identity cancellation sub-module, configured to cancel the user identity. The cancellation of the user identity may include two cancellation modes: a user-based active cancellation mode and a third-party certification authority-based cancellation mode.

According to a third aspect of the present disclosure, a system for implementing identity endorsement on a blockchain is provided, that may include:

a processor, configured to execute a plurality of instructions; and a memory, configured to store the plurality of instructions.

The plurality of instructions may be configured to be stored by the memory and loaded by the processor to perform the method for implementing identity endorsement on a blockchain as described previously.

According to a fourth aspect, a computer-readable storage medium is provided. The storage medium stores a plurality of instructions therein that are configured to be loaded by a processor and perform a method for implementing identity endorsement on a blockchain as described previously.

According to the above solutions of the present disclosure, based on the existing blockchain address or account system, the user identity may be endorsed for a user in combination with a qualified and capable third-party certification authority. The third-party certification authority may issue a certification statement to prove the identity after completing the identity verification for the user. The certification statement may only be stored in the form of a Hash value on the blockchain, which can confirm the real identity information of the user and will not leak the real identity information of the user. Moreover, without changing the existing account system, identity information is added to an account and can be verified in the blockchain.

The above description is only an overview of technical solutions of the present disclosure. In order to understand the technical means of the present disclosure more clearly and implement them in accordance with the content of the specification, example embodiments of the present disclosure are described in detail below with the accompanying drawings.

BRIEF DESCRIPTION OF THE DRAWINGS

The drawings constituting a part of the present disclosure are used to provide a further understanding of the present disclosure. The present disclosure provides the following drawings for illustration. In the drawings.

DETAILED DESCRIPTION

In order to make the objectives, technical solutions, and advantages of the present disclosure clearer, example technical solutions of the present disclosure are described below clearly and completely with reference to specific embodiments of the present disclosure and the corresponding drawings. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Figure 1:
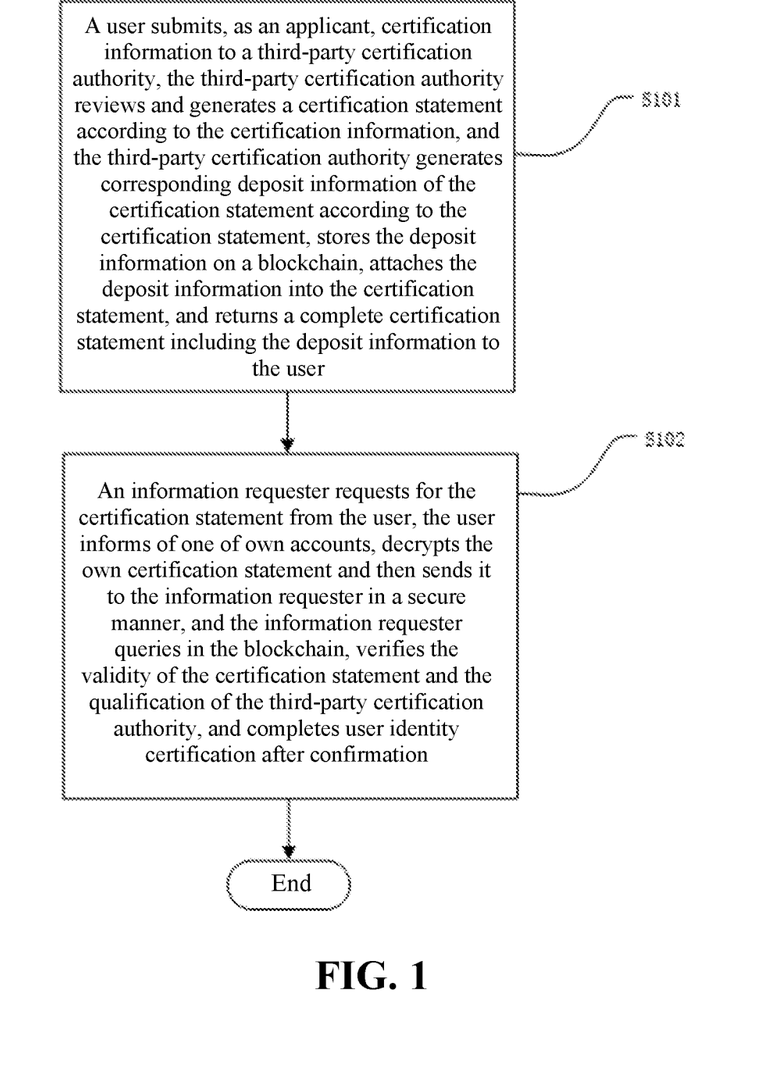
FIG. 1 is a flowchart of an example method for implementing identity endorsement on a blockchain according to the present disclosure.

First, an example method for implementing identity endorsement on a blockchain of the present disclosure is explained in conjunction with FIG. 1. FIG. 1 shows an example flowchart of a method for implementing identity endorsement on a blockchain according to the present disclosure. As shown in FIG. 1, the example method includes the following steps.

step S101: submitting, by a user as an applicant, certification information to a third-party certification authority, reviewing by the third-party certification authority, generating a certification statement according to the certification information, generating, by the third-party certification authority, corresponding deposit information of the certification statement according to the certification statement, storing the deposit information on a blockchain, attaching the deposit information into the certification statement, and returning a complete certification statement including the deposit information to the user, the user being an individual user or an enterprise; and In step S102, an information requester requests for the certification statement from the user, the user informs of one of own accounts, decrypts the user's own certification statement and then sends it to the information requester in a secure manner, and the information requester checks in the blockchain, to verify the validity of the certification statement and the qualification of the third-party certification authority, and completes user identity certification after confirmation.

The existing blockchain account system may divided into an address account and a name account. The address account may be derived from a private key. In the name account, an account name may be set by a user and is not related to the private key. In the present embodiment, the above two accounts are collectively referred to as an account.

In step S101, a user submits, as an applicant, certification information to a third-party certification authority, the third-party certification authority reviews the certification information and generates a certification statement according to the certification information, and the third-party certification authority generates corresponding deposit information of the certification statement according to the certification statement, stores the deposit information on a blockchain, attaches the deposit information into the certification statement, and returns a complete certification statement that may include the deposit information to the applicant for registering the user identity. The user identity is unique and is used to indicate a person or an entity in a real environment.

Figure 2:
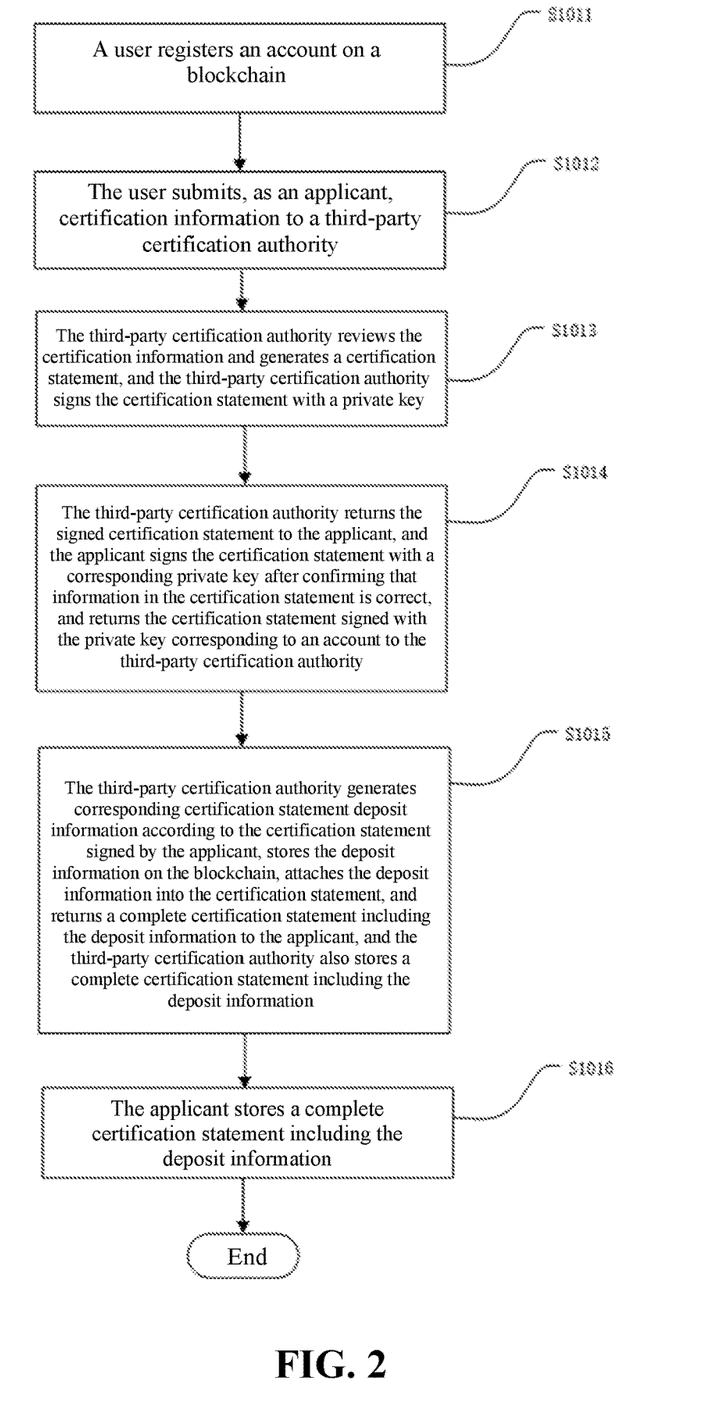
FIG. 2 is a flowchart of an example method for registering and certificating user identity according to the present disclosure.

Specifically, a method for registering user identity according to the present disclosure is described with reference to FIG. 2. FIG. 2 shows an example flowchart of a method for registering user identity according to the present disclosure. As shown in FIG. 2, in this example step S101 may include the following steps.

In step S1011, a user registers an account on the blockchain.

The user may have a plurality of accounts. One of the accounts is a main account, and any remaining accounts may be sub-accounts.

In step S1012, the user submits, as an applicant, certification information to a third-party certification authority.

In order to facilitate the user to certificate a plurality of accounts at a time, in the certification information sent to the third-party certification authority, the user may add one or more sub-account information including signature information of each sub-account, and the account information and signature information of the main account of the user, the one or more sub-account information, and signature information corresponding to each sub-account are all submitted, as the certification information, to the third-party certification authority.

In step S1013, the third-party certification authority reviews the certification information and generates a certification statement according to the materials submitted by the user, and the third-party certification authority signs the certification statement with a private key.

The private key used by the third-party certification authority is a private key of the third-party certification authority.

In step S1014, the third-party certification authority returns the signed certification statement to the applicant, and the applicant signs the certification statement with a private key corresponding to an account of the applicant after confirming that information in the certification statement is correct, and returns the certification statement signed with the private key corresponding to the account to the third-party certification authority.

After confirming that the information in the certification statement is correct, the applicant uses the private key corresponding to the account of the applicant to sign the certification statement to indicate the approval of the content of the certification statement.

step S1015: generating, by the third-party certification authority, corresponding deposit information of the certification statement according to the certification statement signed by the applicant, storing the deposit information on the blockchain, attaching the deposit information into the certification statement, returning a complete certification statement including the deposit information to the applicant, and storing, also by the third-party certification authority, a complete certification statement including the deposit information; and In the present example, the complete certification statement including the deposit information is composed of a certification statement signed by the third-party certification authority and then signed by the account corresponding to the applicant, and additional deposit information. The additional deposit information is used as accessory information and does not need to be signed.

The main account and the sub-account may be distinguished in the deposit information of the certification statement. The deposit information of the certification statement includes a main account and a plurality of sub-accounts of the user (if the user does not have a sub-account, sub-account information is not included), the Hash of certification statement information, and signature information of the third-party certification authority.

In step S1016, the applicant stores a complete certification statement including the deposit information.

In the present example, the applicant may keep the complete certification statement including the deposit information to himself/herself, or may entrust it to a third party or a storage type blockchain for storage after encrypting it. For the case where the same user sends a plurality of accounts for registration, it is possible to bind different accounts of the same user to the same deposit information of the certification statement.

The complete certification statement information kept by the user to himself/herself may include: a main account, a plurality of sub-accounts (if the user does not have a sub-account, sub-account information is not included), an original text of submitted certification information, certification statement information Hash, signature information of the third-party certification authority, and blockchain deposit information.

Another embodiment of the present disclosure may be used to implement supplementary registration of the user identity. For example, after the user has registered the user identity, the user has registered other sub-accounts, or the user has not registered all accounts during the user identity registration. At this moment, the user identity may be supplementarily registered.

Specifically in this example, the supplementary registration of the user identity includes the following steps.

step S1021: issuing, by a user, a supplementary certification application and sending the application to a blockchain smart contract, the supplementary certification application containing signature information of an account of the user that has been certificated, and signature information corresponding to one or more to-be-supplementarily-registered accounts;

In step S1022, the blockchain smart contract verifies whether the account that has been certificated is valid, if yes, the process proceeds to step S1023, otherwise, the supplementary registration is ended.

Specifically, verifying whether the account that has been certificated is valid includes the following steps.

S1: checking whether account information submitted by the user exists in the blockchain, if yes, proceeding to S2, otherwise, the verification failing;

The account information submitted by the user may be the main account or the sub-account.

S2: determining whether the account information has been certificated, that is, whether the account has been bound to the deposit information of the certification statement, if the account submitted by the user is a main account, determining whether the main account has been bound to the deposit information of the certification statement, if the user submits a sub-account, checking whether the sub-account has a main account associated therewith and determining whether the main account has been bound to the deposit information of the certification statement, if the account information has been certificated, proceeding to S3, and if the account information has not been certificated, the verification failing; and In S3, it is determined whether the bound deposit information of the certification statement has been canceled, if yes, the verification fails, and if no, the verification is passed.

step S1023: certificating, by the blockchain smart contract, whether the user is an actual holder of the to-be-supplementarily-registered account, if yes, proceeding to step S1024, and if no, ending the supplementary registration; and Specifically, certificating, by the blockchain smart contract, whether the user is an actual holder of the to-be-supplementarily-registered account includes the following steps.

If the account type is an address account, address information of the user may be derived according to signature information of an application sent by the user to the blockchain smart contract, and it may be determined whether the address information is the same as address information stored in the deposit information of the certification statement.

If the account type is a name account, the name account may contain an address list. Address information of the user may be derived according to signature information of an application sent by the user to the blockchain smart contract, and then it may be determined whether the address information is contained in the address list of the name account. Algorithms for deriving address information from signature information include, but are not limited to, ECDSA and RSA algorithms, depending on the support of a specific blockchain for the algorithms.

In step S1024, the blockchain smart contract binds a plurality of supplementarily registered accounts submitted by the user to the deposit information of the certification statement that has been certificated. The user does not need to repeatedly submit relevant identity materials to the third-party certification authority.

Step S102 of requesting, by an information requester, for the certification statement from the user, informing of, by the user, one of own accounts, decrypting the own certification statement and then sending it to the information requester in a secure manner, checking, by the information requester, in the blockchain, to verify the validity of the certification statement and the qualification of the third-party certification authority, and completing user identity certification after confirmation includes the following steps.

The information requester sends a request to the user. The request is used to request for the certification statement of the user.

The security mode may be, for example, an HTTPS mode.

The information requester checks in the blockchain according to a certification statement file.

The validity verification of the certification statement may include: in the case where the certification statement file contains the name and signature information of a certification authority, calculating a corresponding Hash value using a Hash algorithm from an original certification statement file, and then comparing the Hash value with the Hash value in the deposit information of the certification statement stored on the blockchain. If the Hash values are the same, it means that the certification statement has passed the certification.

The qualification verification of the third-party certification authority may include: determining according to actual usage scenarios. For example, the certification authority must be a certification authority recognized by the local government.

Further, the method for implementing identity endorsement on a blockchain according to the present disclosure may also include an identity cancellation process, which has two identity cancellation modes, namely, user-based active cancellation and third-party certification authority-based cancellation.

In this example, the user-based active cancellation method includes the following steps.

In S1, sending, by the user, cancellation information to the blockchain directly by himself/herself or through an agency;

In S2, after the blockchain verifies the user identity through the account, the deposit information of the certification statement of the user is canceled.

Specifically, the user may specify to cancel information under a certain account, or directly cancel the identity. If the identity is canceled directly, the information of all accounts corresponding to the identity will be invalid.

In S3, the third-party certification authority monitors the generated certification statement, and if the deposit information of the certification statement that is actively canceled by the user is found, the third-party certification authority executes an internal cancellation process to cancel the certification statement of the user stored in the third-party certification authority.

The third-party certification authority-based cancellation method may include the following steps.

In S1, the third-party certification authority sends cancellation information to the blockchain.

In S2, after the blockchain verifies the authority identity through the account of the third-party certification authority, specified deposit information of the certification statement is canceled.

Since the third-party certification authority cancels the user identity, once the user identity is canceled, information of all accounts corresponding to the identity will be invalid.

In S3, after confirming that the cancellation is successful, the third-party authority informs the user of that the user identity has been canceled.

Figure 3:
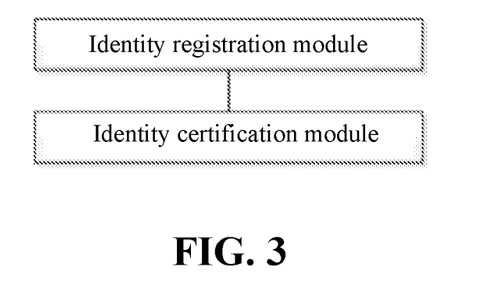
FIG. 3 is a composition block diagram of an example device for implementing identity endorsement on a blockchain according to the present disclosure.

Please refer to FIG. 3, which is a composition block diagram of an example device for implementing identity endorsement on a blockchain according to the present disclosure. As shown in the figure, the example device includes:

an identity registration module, configured to submit, by a user as an applicant, certification information to a third-party certification authority, review by the third-party certification authority, generate a certification statement according to the certification information, generate, by the third-party certification authority, corresponding deposit information of the certification statement according to the certification statement, store the deposit information on a blockchain, attach the deposit information into the certification statement, and return a complete certification statement comprising the deposit information to the user, the user being an individual user or an enterprise; and an identity certification module, configured to request, by an information requester, for the certification statement from the user, inform of, by the user, one of own accounts, decrypt the own certification statement and then send it to the information requester in a secure manner, check, by the information requester, in the blockchain, to verify the validity of the certification statement and the qualification of the third-party certification authority, and complete user identity certification after confirmation.

Further, the identity registration module may include:
a registration sub-module, configured to register, by a user, an account on the blockchain;
a certification information submitting sub-module, configured to submit, by the user as an applicant, certification information to a third-party certification authority;
a reviewing sub-module, configured to review, by the third-party certification authority, the certification information, generate a certification statement according to the materials submitted by the user, and sign, by the third-party certification authority, the certification statement with a private key;
a confirmation sub-module, configured to return, by the third-party certification authority, the signed certification statement to the applicant, sign, by the applicant, the certification statement with a private key corresponding to an account of the applicant after confirming that information in the certification statement is correct, and return the certification statement signed with the private key corresponding to the account to the third-party certification authority;
a first storage sub-module, configured to generate, by the third-party certification authority, corresponding deposit information of the certification statement according to the certification statement signed by the applicant, store the deposit information on the blockchain, attach the deposit information into the certification statement, return a complete certification statement comprising the deposit information to the applicant, and store, also by the third-party certification authority, a complete certification statement comprising the deposit information; and
a second storage sub-module, configured to store, by the applicant, a complete certification statement including the deposit information.

Further, the device for implementing identity endorsement on a blockchain may further include: a supplementary registration module, configured to supplementarily register the user identity. The supplementary registration module may include:
a supplementary certification application sub-module, configured to issue, by a user, a supplementary certification application and send the application to a blockchain smart contract, the supplementary certification application containing signature information of an account of the user that has been certificated, and signature information corresponding to one or more to-be-supplementarily-registered accounts;
a first determination sub-module, configured to verify, by the blockchain smart contract, whether the account that has been certificated is valid;
a second determination sub-module, configured to certificate, by the blockchain smart contract, whether the user is an actual holder of the to-be-supplementarily-registered account; and
an information binding sub-module, configured to bind, by the blockchain smart contract, a plurality of supplementarily registered accounts submitted by the user to the deposit information of the certification statement that has been certificated.

Further, the first determination sub-module may include:
a check sub-module, configured to check whether account information submitted by the user exists in the blockchain;
a determination sub-module, configured to determine whether the account information has been certificated, that is, whether the account has been bound to the deposit information of the certification statement, if the account submitted by the user is a main account, determine whether the main account has been bound to the deposit information of the certification statement, if the user submits a sub-account, check whether the sub-account has a main account associated therewith, and determine whether the main account has been bound to the deposit information of the certification statement; and
a cancellation determination sub-module, configured to determine whether the bound deposit information of the certification statement has been canceled.

Further, the device for implementing identity endorsement on a blockchain may further include: an identity cancellation sub-module, configured to cancel the user identity. The cancellation of the user identity may include two cancellation modes: a user-based active cancellation mode and a third-party certification authority-based cancellation mode.

An embodiment of the present disclosure may further provide a system for implementing identity endorsement on a blockchain, that may include:
a processor, configured to execute a plurality of instructions; and
a memory, configured to store the plurality of instructions.

The plurality of instructions are configured to be stored by the memory and loaded by the processor to perform the method for implementing identity endorsement on a blockchain as described above.

An embodiment of the present disclosure may further provide a computer-readable storage medium. The storage medium stores a plurality of instructions therein that are configured to be loaded by a processor and perform a method for implementing identity endorsement on a blockchain as described above.

It should be noted that the embodiments in the present disclosure and the features in the embodiments may be combined with each other if there is no conflict.

In the several embodiments provided by the present disclosure, it should be understood that the disclosed system, device, and methods may be implemented in other ways. For example, the device embodiments described above are merely illustrative. For example, the division of the units is only a logical function division, and there may be other divisions in actual implementation. For example, multiple units or components may be combined or may be integrated into another system, or some features may be ignored or not executed. In addition, the displayed or discussed mutual coupling or direct coupling or communication connection may be indirect coupling or communication connection through some interfaces, devices, or units, and may be in electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of the present embodiment.

In addition, the functional units in each embodiment of the present disclosure may be integrated into one processing unit, or each unit may exist alone physically, or two or more units may be integrated into one unit. The above integrated unit may be implemented in the form of hardware or in the form of hardware and a software functional unit.

The above integrated unit implemented in the form of the software functional unit may be stored in a computer-readable storage medium. The above software functional unit is stored in a storage medium and includes a plurality of instructions to make a computer device (which may be a personal computer, a physical server, or a network cloud server, etc., required to be installed with Windows or Windows Server operating systems) to perform part of the steps of the method in each embodiment of the present disclosure. The aforementioned storage medium includes: a U disk, a mobile hard disk, a Read-Only Memory (ROM), a Random Access Memory (RAM), a magnetic disk or an optical disk, and other media that may store program code.

The above are only example embodiments of the present disclosure, and are not intended to limit the present disclosure in any form. Any simple alterations, equivalent changes, and modifications made to the above embodiments based on the technical essence of the present disclosure still fall within the scope of the technical solution of the present disclosure.

The invention claimed is:

1. A computer-implemented method for implementing identity endorsement on a blockchain, comprising:
   receiving, at a third-party certification authority, from a user as an applicant, certification information, reviewing by the third-party certification authority, the certification information and generating, by the third-party certification authority, a certification statement according to the certification information, generating, by the third-party certification authority, corresponding deposit information of the certification statement according to the certification statement, storing the deposit information on a blockchain, attaching the deposit information into the certification statement, and returning a complete certification statement comprising the deposit information to the user, the user being an individual user or an enterprise; and
   receiving, from the applicant, a signed certification statement, wherein the signed certification statement is the certification statement signed by the applicant with a private key;
   wherein the generating, by the third-party certification authority, corresponding deposit information includes generating the corresponding deposit information according to the certification statement signed by the applicant; and
   storing, by the third-party certification authority, the complete certification statement comprising the deposit information on the blockchain.

2. The computer-implemented method for implementing identity endorsement on a blockchain according to claim 1, the user identity being supplementarily registered in a supplementary registration, wherein supplementarily registering the user identity comprises:
   receiving, at a blockchain smart contract, from a user, a supplementary certification application, the supplementary certification application containing signature information of an account of the user that has been certificated, and signature information corresponding to one or more to-be-supplementarily-registered accounts; and
   verifying, by the blockchain smart contract, whether the account that has been certificated is valid,
      if the account that has been certified is not valid, then ending the supplementary registration, and;
      if the account that has been certified is valid, then certificating, by the blockchain smart contract, whether the user is an actual holder of the to-be-supplementarily-registered account,
         if the user is not an actual holder of the to-be-supplementarily-registered account, then ending the supplementary registration, and
         if the user is an actual holder of the to-be-supplementarily-registered account, then
      binding, by the blockchain smart contract, a plurality of supplementarily registered accounts submitted by the user to the deposit information of the certification statement that has been certificated.

3. The computer-implemented method for implementing identity endorsement on a blockchain according to claim 2, wherein verifying, by the blockchain smart contract, whether the account that has been certificated is valid comprises:
   checking whether account information submitted by the user exists in the blockchain,
      if the account information submitted by the user does not exist in the blockchain, then the verification failing, and
      if the account information submitted by the user does exist in the blockchain, then
         determining whether the account information has been certificated, wherein the determining whether the account information has been certificated includes determining whether the account has been bound to the deposit information of the certification statement, in response to the account information submitted by the user being a main account, determining whether the main account has been bound to the deposit information of the certification statement, in response to the account information submitted by the user being a sub-account, checking whether the sub-account has a main account associated therewith and determining whether the main account has been bound to the deposit information of the certification statement, if the account information has not been certificated, then the verification failing, and
      if the account information has been certified, then
         determining whether the bound deposit information of the certification statement has been canceled,
            if the bound deposit information of the certification statement has been cancelled, then the verification failing, and
            if the bound deposit information of the certification statement has not been cancelled, then passing the verification.

4. The computer-implemented method for implementing identity endorsement on a blockchain according to claim 1, wherein the user identity may be canceled, wherein the cancellation of the user identity comprises two cancellation modes: a user-based active cancellation mode and a third-party certification authority-based cancellation mode;
   the user-based active cancellation mode comprises:

receiving, at the blockchain, from the user, cancellation information corresponding to an account;

after the blockchain verifies the user identity through the account, canceling the deposit information of the certification statement of the user; and monitoring, by the third-party certification authority, the generated certification statement, and if the deposit information of the certification statement that is actively canceled by the user is found, executing, by the third-party certification authority, an internal cancellation process to cancel the certification statement of the user stored in the third-party certification authority;

the third-party certification authority-based cancellation mode comprises:

sending, by the third-party certification authority, cancellation information to the blockchain;

after the blockchain verifies the identity of the third-party certification authority through the account of the third-party certification authority, canceling specified deposit information of the certification statement; and after confirming that the cancellation is successful, informing, by the third-party authority, the user of that the user identity has been canceled.

5. A system for implementing identity endorsement on a blockchain, comprising:

a processor, configured to execute a plurality of instructions; and a memory, configured to store the plurality of instructions, wherein the plurality of instructions are configured to be stored by the memory and loaded by the processor to perform the computer-implemented method for implementing identity endorsement on a blockchain according to claim 1.

6. A non-transitory computer-readable storage medium, storing a plurality of instructions therein that are configured to be loaded by a processor and perform the computer-implemented method for implementing identity endorsement on a blockchain according to claim 1.

7. The computer-implemented method for implementing identity endorsement on a blockchain according to claim 1, further comprising:

requesting, by an information requester, for the certification statement from the user, decrypting, by the user, the requested certification statement and then sending, by the user, the decrypted certification statement to the information requester in a secure manner, checking, by the information requester, in the blockchain, to verify the validity of the certification statement and qualification of the third-party certification authority, and completing user identity certification after confirmation according to the result of the verify step.

8. The computer-implemented method for implementing identity endorsement on a blockchain according to claim 1, wherein the complete certification statement including the deposit information includes the certification statement signed by the third-party certification authority and then signed by the account corresponding to the applicant, and the deposit information, wherein the deposit information includes a main account and a plurality of sub-accounts of the user, a Hash of information contained in the certification statement, and signature information of the third-party certification authority.

9. A device for implementing identity endorsement on a blockchain, comprising:

an identity registration module, configured to submit, by a user as an applicant, certification information to a third-party certification authority, review by the third-party certification authority the certification information, and generate a certification statement according to the certification information, generate, by the third-party certification authority, corresponding deposit information of the certification statement according to the certification statement, store the deposit information on a blockchain, attach the deposit information into the certification statement, and return a complete certification statement comprising the deposit information to the user, the user being an individual user or an enterprise; and an identity certification module, configured to request, by an information requester, for the certification statement from the user, receive a decrypted version of the requested certification statement from the user, check, by the information requester, in the blockchain, to verify validity of the certification statement and qualification of the third-party certification authority, and complete user identity certification after confirmation;

wherein the identity registration module comprises:

a registration sub-module, configured to register, by a user, an account on the blockchain;

a certification information submitting sub-module, configured to submit, by the user as an applicant, certification information to a third-party certification authority;

a reviewing sub-module, configured to review, by the third-party certification authority, the certification information, generate a certification statement according to materials submitted by the user, and sign, by the third-party certification authority, the certification statement with a private key to create a signed certification statement;

a confirmation sub-module, configured to return, by the third-party certification authority, the signed certification statement to the applicant, sign, by the applicant, the certification statement with a private key corresponding to an account of the applicant after confirming that information in the certification statement is correct, and return the certification statement signed with the private key corresponding to the account to the third-party certification authority;

a first storage sub-module, configured to generate, by the third-party certification authority, corresponding deposit information of the certification statement according to the certification statement signed by the applicant, store the deposit information on the blockchain, attach the deposit information into the certification statement, return a complete certification statement comprising the deposit information to the applicant, and store, also by the third-party certification authority, a complete certification statement comprising the deposit information; and a second storage sub-module, configured to store, by the applicant, a complete certification statement comprising the deposit information.

10. The device for implementing identity endorsement on a blockchain according to claim 9, further comprising: a supplementary registration module, configured to supplementarily register the user identity, wherein the supplementary registration module comprises:

a supplementary certification application sub-module, configured to issue, by a user, a supplementary certification application and send the application to a blockchain smart contract, the supplementary certification application containing signature information of an account of the user that has been certificated, and signature information corresponding to one or more to-be-supplementarily-registered accounts;

a first determination sub-module, configured to verify, by the blockchain smart contract, whether the account that has been certificated is valid;

a second determination sub-module, configured to certificate, by the blockchain smart contract, whether the user is an actual holder of the to-be-supplementarily-registered account; and an information binding sub-module, configured to bind, by the blockchain smart contract, a plurality of supplementarily registered accounts submitted by the user to the deposit information of the certification statement that has been certificated.

11. The device for implementing identity endorsement on a blockchain according to claim 10, wherein the first determination sub-module comprises:

a check sub-module, configured to check whether account information submitted by the user exists in the blockchain;

a determination sub-module, configured to determine whether the account information has been certificated, that is, whether the account has been bound to the deposit information of the certification statement, if the account submitted by the user is a main account, determine whether the main account has been bound to the deposit information of the certification statement, if the user submits a sub-account, check whether the sub-account has a main account associated therewith, and determine whether the main account has been bound to the deposit information of the certification statement; and a cancellation determination sub-module, configured to determine whether the bound deposit information of the certification statement has been canceled.

12. The device for implementing identity endorsement on a blockchain according to claim 9, further comprising: an identity cancellation sub-module, configured to cancel the user identity, wherein the cancellation of the user identity comprises two cancellation modes:

a user-based active cancellation mode and a third-party certification authority-based cancellation mode.

\* \* \* \* \*